(No Model.) 2 Sheets—Sheet 1.

J. W. BONTA.
APPARATUS FOR MANUFACTURING EMBOSSED GLASS TABLETS.

No. 527,476. Patented Oct. 16, 1894.

Witnesses:
E. M. Parker
A. S. Moore

Inventor:
James W. Bonta
by his Attorney,
Jno. E. Parker

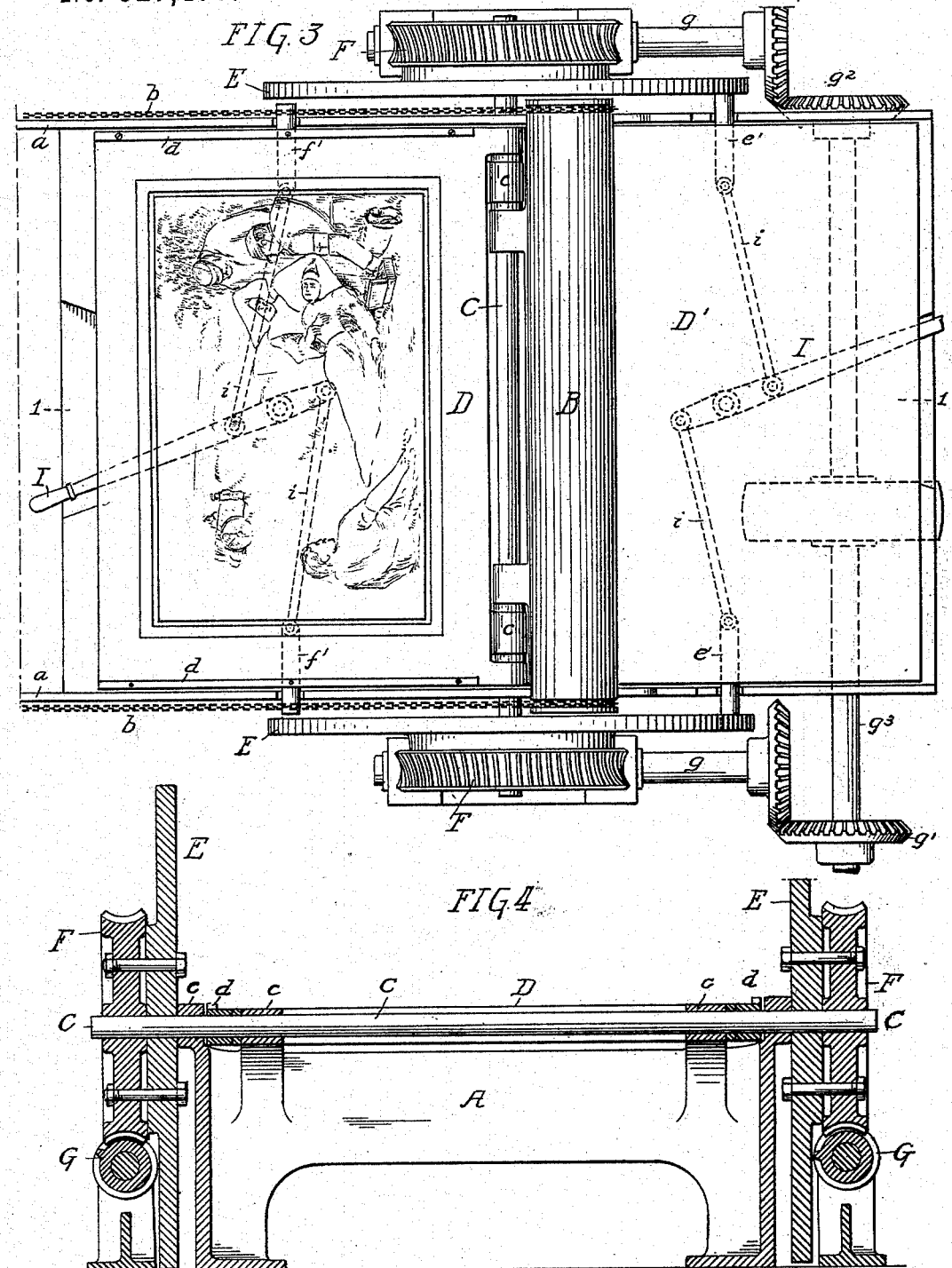

UNITED STATES PATENT OFFICE.

JAMES W. BONTA, OF WAYNE, PENNSYLVANIA, ASSIGNOR TO THE BONTA PLATE GLASS COMPANY, OF WEST VIRGINIA.

APPARATUS FOR MANUFACTURING EMBOSSED-GLASS TABLETS.

SPECIFICATION forming part of Letters Patent No. 527,476, dated October 16, 1894.

Application filed August 22, 1893. Serial No. 483,720. (No model.)

*To all whom it may concern:*

Be it known that I, JAMES W. BONTA, a citizen of the United States, residing at Wayne, in the county of Delaware and State of Pennsylvania, have invented certain new and useful Apparatus for Manufacturing Embossed-Glass Tablets; and I do declare the following to be a full, clear, and exact description of the invention, such as will enable others skilled in the art to which it appertains to make and use the same.

My invention has for its object the production of tablets or slabs of embossed glass, more especially applicable for decorative or finishing work in building interiors, and is designed to be employed in lieu of plaster, wood or tiling for side walls or ceilings, and is especially valuable for use as a substitute for tiling or hard wood in vestibules or wainscoting, as contra-distinguished from translucent plate or sheet glass, ordinarily employed for windows or skylights.

The apparatus I propose to employ in carrying out my invention is designed for the rapid production of large tablets of glass, so that after a tablet has been rolled it may be transferred to an annealing oven before sufficient time has elapsed for the glass to chill or "check."

In carrying out my invention I employ two platforms, hinged at one edge, preferably in a manner similar to the sections of a book-slate, except that when folded, a space will be left between the two of sufficient width to receive a tablet of glass. One of these platforms is provided with a molded or engraved or cast design which may be preferably removable for the insertion of a new mold when different designs are to be produced. A sufficient quantity of molten glass is then placed on the engraved platform and a roll is passed over the glass pressing it into the engraved portions of the platform. After the rolling operation, the second platform, having a plain face, is swung over on its hinge until it rests upon the tablet of glass, the latter being then confined between the two platforms. The two platforms are then secured together, and both turned with their hinge-point as a fulcrum, until the tablet rests upon the second platform with its ornamented face uppermost, and in convenient position to be removed to a leer or annealing oven. The engraved platform is then unclamped and swung back to its initial position in readiness to receive a fresh supply of glass for the production of a new tablet.

Figure 1:
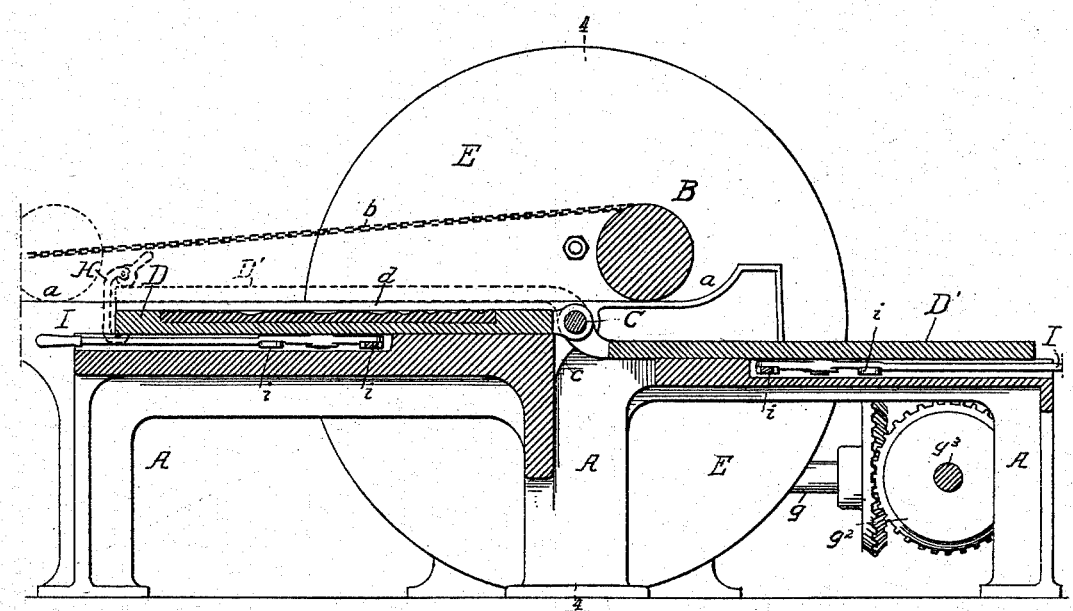
Figure 2:
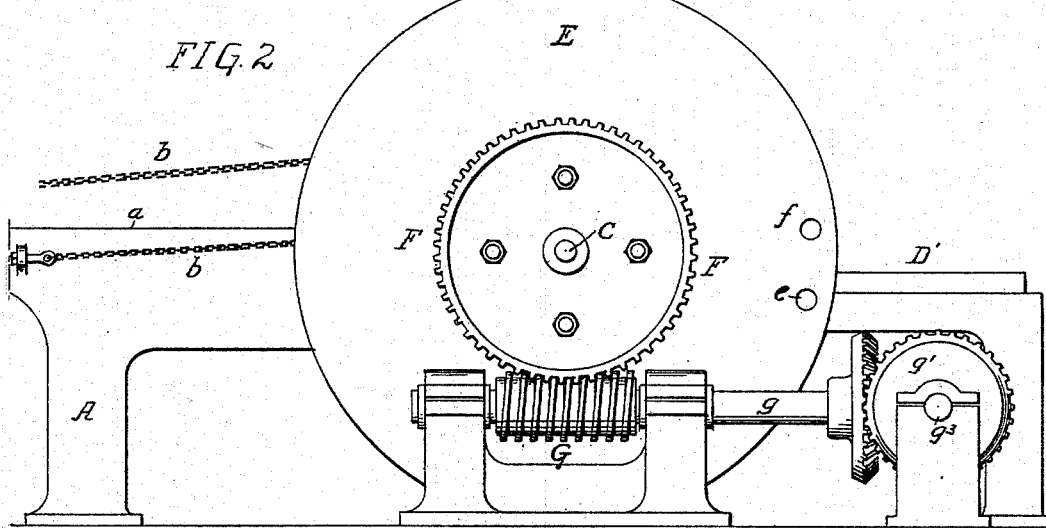

In the accompanying drawings:—Figure 1 is a longitudinal section on the line 1—1, Fig. 3, of an apparatus constructed in accordance with my invention. Fig. 2 is a side elevation of the same. Fig. 3 is a plan view, and Fig. 4 is a transverse section on the line 4—4, Fig. 1.

Referring to the drawings, A represents a suitable frame-work upon which the various operating parts are supported. On either side of the frame are supporting rails, $a$, upon which the opposite ends of the glass pressing roller, B, may rest before and after the rolling operation. At, or at about, the center of the frame, is a transversely extending shaft, C, adapted to bearings, $c$, on the frame, and forming a hinge pin for two platforms, D, D', which may be folded together, and when so folded leave between them a space for the reception of the tablet of manufactured glass. Mounted on the opposite ends of the shaft, C, at each side of the frame, A, are wheels, or arms, E, provided with suitable orifices, $e$, $f$, adapted to be engaged by sliding pins, $e'$, $f'$, carried by the platforms, D, D', respectively and secured to these wheels, E, are worm-wheels, F, which intermesh with worms, G, mounted on shafts, $g$, which may be connected by bevel gears, $g'$, $g^2$, mounted on a transverse shaft, $g^3$, as shown in Figs. 1 and 3 and driven from any suitable source of power. The driving shaft, $g^3$, may also be so arranged as to be automatically clutched to, or released from, the worm driving shaft at different points in the revolution of the worm-wheels.

The platform, D, is provided on its upper surface with a molded or engraved design of any suitable character which may be in the platform itself or on a removable section or plate and at either side are removable strips, $d$, upon which the glass-pressing roller, B, travels during the pressing operation, the height of the strips, $d$, being dependent upon the thickness of the tablet of glass to be manufactured.

The initial position of the various parts is that illustrated in Fig. 1 with the platforms opened and resting upon the top of frame and pressing-roller, B, somewhat to the rear of the hinge-joint of the platforms. A sufficient quantity of molten glass is then placed on the engraved platform, D, and the roller, B, is moved forward in the direction of the arrow, pressing the molten glass down into the recessed portions of the mold and smoothing off the upper surface of the tablet. The roller may be traveled over the platform in any suitable manner such, for instance, as that illustrated in Fig. 1 wherein operating chains, b, are secured to the ends of the frame-work and pass partially around annular grooves, b', formed in either end of the roll and the latter being traveled from the position shown by full lines in Fig. 1 to that shown by dotted lines in said figure by simply pulling on the loose ends of the chains. After the pressing roller has been traveled over the molten glass and formed a tablet of the required thickness, it rests during the remainder of the operation upon the rails, a, of the frame, assuming the position shown by dotted lines in Fig. 1. The wheels, or arms, E, are then rotated in the direction of the arrow, Fig. 1, the sliding pins, e, having been first engaged in the recesses, e', of the wheel, and the platform, D', is moved from the position shown in Fig. 1 to that shown by dotted lines in said figure and is firmly secured to the platform, D, by a clamp, H, confining the tablet of glass between the two platforms. The pins, f, are then engaged in the recess, f', of the platform, D, and the two platforms, with the tablet of glass between them, are moved until the platform, D', assumes its initial position with the tablet of glass resting upon it, and having its ornamental face uppermost. The platform, D, is then unclamped from the platform, D', leaving the glass resting upon the latter and the direction of rotation of the wheels, E, is reversed until the platform, D, has again assumed its initial position in readiness to receive a fresh supply of molten glass.

Any suitable mechanism may be employed for effecting the engagement of the locking pins, e, f, with their respective recesses, e', f', a simple structure being shown in the drawings, in which the pins at the opposite edges of each platform are guided in eyes formed beneath the platform and the inner ends of the pins being connected by rods, i, to a lever, I, fulcrumed to the under side of the platform and so arranged as to simultaneously act upon the pins at the opposite sides of the platform.

It will be understood that various modifications of the mechanism for actuating the platforms may be made without departing from my invention, for instance a semi-circular rack may be placed at either side of the frame and the platforms may be supplied with operative pinions adapted to engage with the same.

The mechanism for effecting the clamping of the two platforms may also be varied, and any suitable form of clamp be employed in lieu of that shown in the drawings.

In the claims, the term, engraved platform, is used to designate a platform having an engraved or molded surface or provided with a removable mold having a suitable design engraved or cast thereon.

Having thus described my invention, what I claim, and desire to secure by Letters Patent, is—

1. In combination, a frame-work, a table hinged thereto and having an ornamented face, a hinged table having a plain face, a glass-pressing roller, and means for operating the tables and roller.

2. An apparatus for the manufacture of ornamental glass, comprising in combination, a supporting frame, an engraved platform and a plain platform fulcrumed thereto, and to each other, a pressing roller, and means for reversing the relative positions of the platforms, substantially as specified.

3. An apparatus for the manufacture of ornamental glass comprising in combination, an engraved platform, a pressing roller adapted to pass over the same, a second platform adapted to be clamped to the engraved platform, clamping or securing devices for holding the platens together, and mechanism for reversing the positions of the platens and for returning the engraved platen to its initial position, substantially as specified.

4. An apparatus for the manufacture of ornamental glass comprising in combination, two platforms hinged together at one edge, one of such platforms being engraved, a glass pressing roller adapted to pass over the engraved platform and mechanism for moving the second platform to a position immediately over the engraved platform, for reversing the position of the platforms and for returning the engraved platform to its initial position, substantially as specified.

5. The combination of the two platforms, hinged together at one edge, one of such platforms having engraved thereon a design to be reproduced in a tablet of glass, a supporting frame, oscillated operating wheels at each side of the frame, sliding pins adapted to lock the platforms to the wheels and mechanism for operating said wheels, substantially as specified.

6. The combination of the pressing roller, the two platforms, hinged together at one edge, one of such platforms having engraved thereon a design to be reproduced in a tablet of glass, a supporting frame, oscillated operating wheels at each side of the frame, sliding pins adapted to lock the platforms to the wheels, worm gearing connected to and adapted to rotate the wheels, and mechanism for reversing the direction of the rotation of the worm gearing, substantially as specified.

In testimony whereof I affix my signature in presence of two witnesses.

JAMES W. BONTA.

Witnesses:
JNO. E. PARKER,
JOHN C. GALLEN.